(12) United States Patent
Lee et al.

(10) Patent No.: US 6,726,763 B2
(45) Date of Patent: Apr. 27, 2004

(54) INCREASED WAVELENGTH COVERAGE IN NONLINEAR OPTICS BY NONUNIFORMLY CHIRPED QUASI-PHASE-MATCHING

(75) Inventors: Gregory Steven Lee, Mountain Vie, CA (US); Roger Lee Jungerman, Petaluma, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 128 days.

(21) Appl. No.: 09/993,025

(22) Filed: Nov. 6, 2001

(65) Prior Publication Data

US 2003/0084837 A1 May 8, 2003

(51) Int. Cl.[7] .................................................. C30B 1/02
(52) U.S. Cl. ........................................ 117/2; 423/328.2
(58) Field of Search ............................. 117/2; 423/328.2

(56) References Cited

PUBLICATIONS

Moshe Nazarathy and D. W. Dolfi, "Spread–spectrum nonlinear–optical interactions: quasi–phase matching with pseudorandom polarity reversals", *Optics Letters*, vol. 12, p. 823, Oct. 1987, pp. 823–825.

Martin M. Fejer, et al., "Quasi–Phase–Matched Second Harmonic Generation: Tuning and Tolerances", IEEE Journal of Quantum Electronics, vol. 28, No. 11, Nov. 1992, pp. 2631–2654.

*Primary Examiner*—Felisa Hiteshew

(57) ABSTRACT

A nonlinear crystal has increased spectral acceptance. The nonlinear crystal includes a plurality of domains. The domains are arranged serially across the nonlinear crystal. The domains have alternating polarity. The poling periods of the domains are varied across the nonlinear crystal so as to provide nonuniform chirping of phase matching of focused optical signals propagated through the nonlinear crystal.

18 Claims, 6 Drawing Sheets

INCREASED WAVELENGTH COVERAGE IN NONLINEAR OPTICS BY NONUNIFORMLY CHIRPED QUASI-PHASE-MATCHING

CROSS REFERENCE TO RELATED APPLICATION

The subject matter disclosed by this application is related to the subject matter within co-pending U.S. patent application Ser. No. 09/885,154 filed Jun. 20, 2001.

BACKGROUND

The present invention concerns optical systems such as an optical sampling digital oscilloscope, and pertains particularly to increased wavelength coverage in nonlinear optics by nonuniformly chirped quasi-phase matching.

Nonlinear crystals are used in optical frequency (OF) mixers within optical fiber communication systems and other optical signal processing systems. Typical second-order polarization coefficients in nonlinear crystals range from a few tenths to a few hundred picometers per volt (pm/V). This level of nonlinearity pales in comparison to that of electronic diodes. Efficient optical mixing using nonlinear crystals requires accumulation over interaction lengths that are orders of magnitude greater than the wavelength.

In an application where an optical signal is mixed with a strobe signal, for modest optical pump power and modest nonlinear coefficient, long nonlinear crystals can be used. However, net accumulation only occurs correctly if the total input photon momentum equals the total output photon momentum to the limit imposed by the uncertainty principle. The shorter the interaction length the greater the allowable momentum error. When viewing light as a wave (versus using a particle description), this is equivalent to requiring phase matching between the output electromagnetic wave and the product of the input waves.

In the past, phase matching has been accomplished in one of four ways. A first way is angle-tuning in birefringent single crystals. A second way is working with a higher-order waveguide mode for the shortest wavelength in the process. A third way, currently being researched, is using photonic crystal design phase matching to modify the linear properties in an appropriate wavelength-dependent fashion.

A fourth way to accomplish phase matching is to use quasi-phase-matching (QPM). When using QPM, crystal domains are periodically reversed to alternate the sign of the nonlinear product polarization while maintaining all of the linear properties. QPM has been implemented by periodic electric-field poling of ferroelectric crystals. Periodically poled lithium niobate (PPLN), for example, is commonly used for QPM. Periodic-poling is accomplished by periodically inverting the crystal structure on the scale of a few microns. QPM has also been implemented by periodic oriented/anti-oriented crystal growth on periodically surface-modified substrates in the zincblende class, although this technique has not enjoyed much success. For further information on QPM, see for example, Martin M. Fejer, et al., "Quasi-Phase-Matched Second Harmonic Generation: Tuning and Tolerances", IEEE Journal of Quantum Electronics, Vol. 28, No. 11, November 1992.

Due to inevitable index of refraction dispersion, all known phase-matching methods have limited spectral acceptance. Indices become singular as the crystal's bandgap is approached. In known phase-matching methods, mixing efficiency peaks at a given design wavelength, but this efficiency drops off as the input wavelength is detuned. The spectral acceptance is inversely proportional to the interaction length. That is, high efficiency and large wavelength coverage are difficult to obtain simultaneously. In most cases, the second way (working with a higher-order waveguide mode for the shortest wavelength in the process) and the third way (phase matching to modify the linear properties in an appropriate wavelength-dependent fashion via photonic crystal design) described above only exacerbate the situation since geometric-related dispersion tends to be much greater than the bulk material dispersion.

In typical prior art implementations of QPM, the poling period is constant across the nonlinear crystal. However, it has been suggested to insert pseudorandom domain reversals to "digitally dither" an otherwise periodic pattern. See, Moshe Nazarathy and D. W. Dolfi, "Spread-spectrum nonlinear-optical interactions: quasi-phase matching with pseudorandom polarity reversals", *Optics Letters*, Vol. 12, page 823, October 1987.

SUMMARY OF THE INVENTION

In accordance with the preferred embodiment of the present invention a nonlinear crystal is used for mixing focused optical signals. The nonlinear crystal includes a plurality of domains. The domains are arranged serially across the nonlinear crystal. The domains have alternating polarity. The poling periods of the domains are varied across the nonlinear crystal so as to provide nonuniform chirping of phase matching of focused optical signals propagated through the nonlinear crystal.

DESCRIPTION OF THE PREFERRED EMBODIMENT

Figure 1:
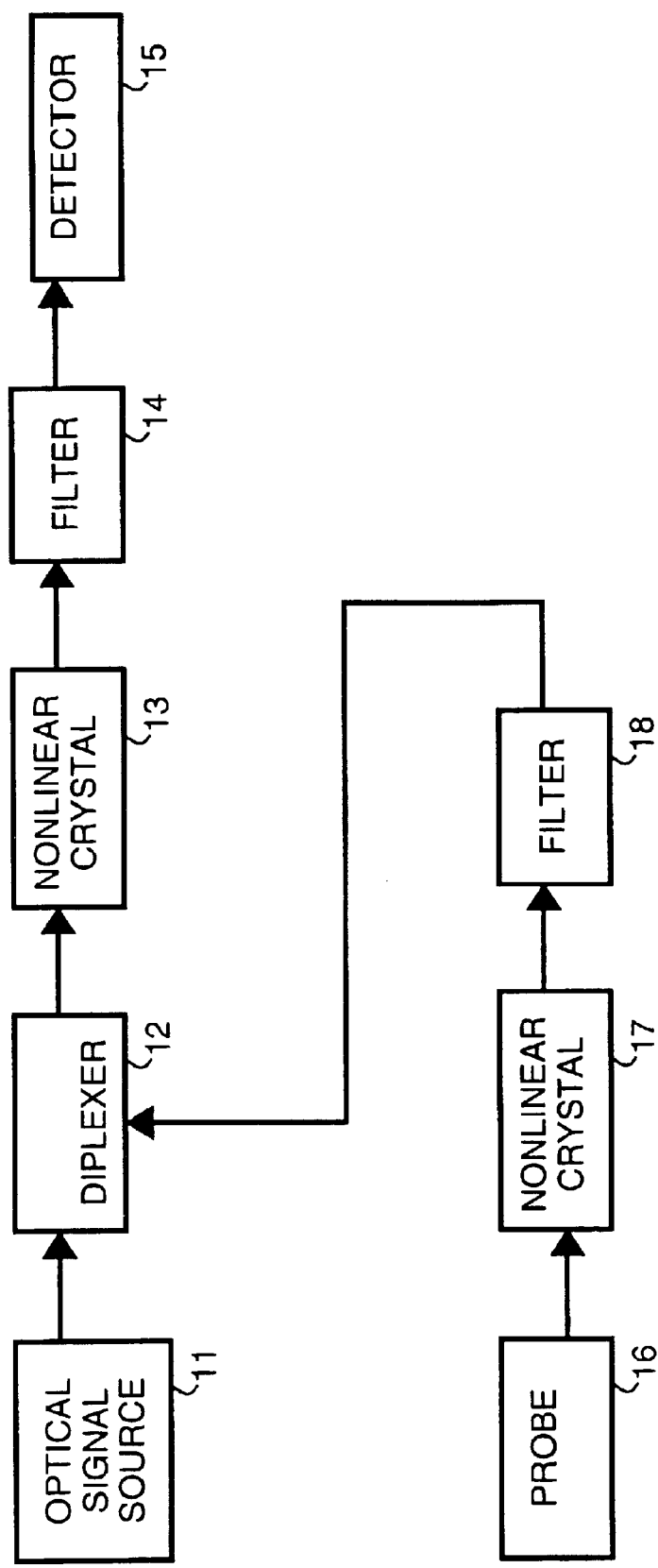
FIG. 1 is a simplified block diagram showing an optical mixer within an optical sampling digital oscilloscope in accordance with a preferred embodiment of the present invention.

FIG. 1 is a simplified block diagram showing an optical mixer within an optical sampling digital oscilloscope. An optical signal source 11 provides an optical signal with a wavelength that varies, for example, between 1.53 micrometers ($\mu$m) and 1.61 $\mu$m.

A probe 16 (also called a pump) generates an optical strobe signal with light waves having a wavelength of approximately 1.55 $\mu$m. Each pulse is approximately 1 picosecond (ps) in duration. There is a period of approximately 20 nanosecond (ns) between pulses.

A nonlinear crystal 17, acting as a second harmonic generator, receives the strobe signal from probe 16 and produces a strobe signal that includes light with a wavelength of approximately 0.775 $\mu$m. For example, nonlinear crystal 17 is a periodically poled lithium niobate (PPLN) crystal.

A filter 18 filters out all but the portion of strobe signal with the wavelength of approximately 0.775 $\mu$m.

A diplexer 12 forwards the optical signal from the optical source and the strobe signal from filter 18 to nonlinear crystal 13. For example, nonlinear crystal 13 is a periodically poled lithium niobate (PPLN) crystal. PPLN is presently the most popular QPM material, although other materials can be used.

Nonlinear crystal 13 mixes the optical signal from the optical source and the strobe signal from filter 18 to nonlinear crystal 13 to produce, among other optical signals, a sum-frequency optical signal that includes light with a wavelength of approximately 0.52 $\mu$m. For example, nonlinear crystal 13 is a chirped periodically poled lithium niobate (PPLN) crystal.

A filter 14 filters out all but the portion of strobe signal with the wavelength of approximately 0.52 $\mu$m. A detector 15 detects the resulting signal for the purpose of use of and/or display by the optical sampling digital oscilloscope.

Figure 2:
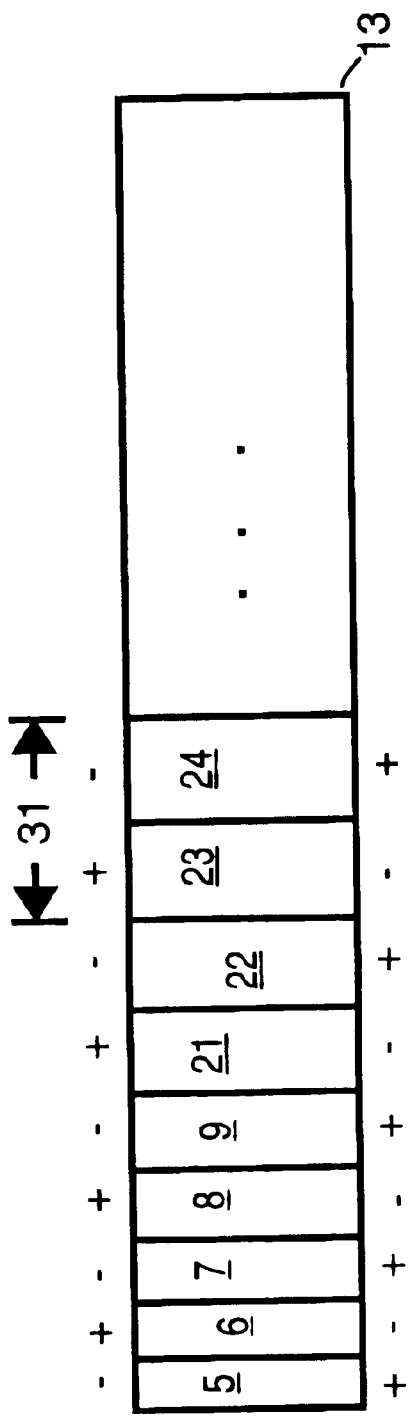
FIG. 2 illustrates use of a chirped crystal structure that serves as a nonlinear optical element in accordance with a preferred embodiment of the present invention.

FIG. 2 illustrates construction of nonlinear crystal 13. FIG. 2 is for illustrative purposes only and is not drawn to scale. Nonlinear crystal 13 includes alternative domains of crystal. These are represented in FIG. 2 by a domain 5, a domain 6, a domain 7, a domain 8, a domain 9, a domain 21, a domain 22, a domain 23 and a domain 24.

From the left end to the right end of nonlinear crystal 13 the poling period ($\Lambda$) increases. The poling period ($\Lambda$) (also called domain inversion spatial period) is the sum of the lengths of two adjacent opposing domains. FIG. 2 shows a poling period 31 as being the sum of the lengths of domain 23 and domain 24.

For example, the poling period linearly increases from 6.6 $\mu$m to 7.5 $\mu$m across the length of nonlinear crystal 13. This use of linearly chirped poling in a nonlinear crystal is a modification of quasi-phase-matching (QPM) in which the poling period is typically constant across the nonlinear crystal. In this case, the poling period remains constant across the nonlinear crystal and is twice the coherent length ($l_c$) of each domain.

By chirping the poling period across the nonlinear crystal, different input-output wavelength sets become phase-matched in different portions of nonlinear crystal 13. The resulting chirped quasi-phase-matching (QPM) widens the spectral acceptance of nonlinear crystal 13. For applications that require acceptance of varying wavelengths of light, this widened spectral acceptance is an advantage over fixed-period QPM or other commonly used phase-matching technology.

Figure 3:
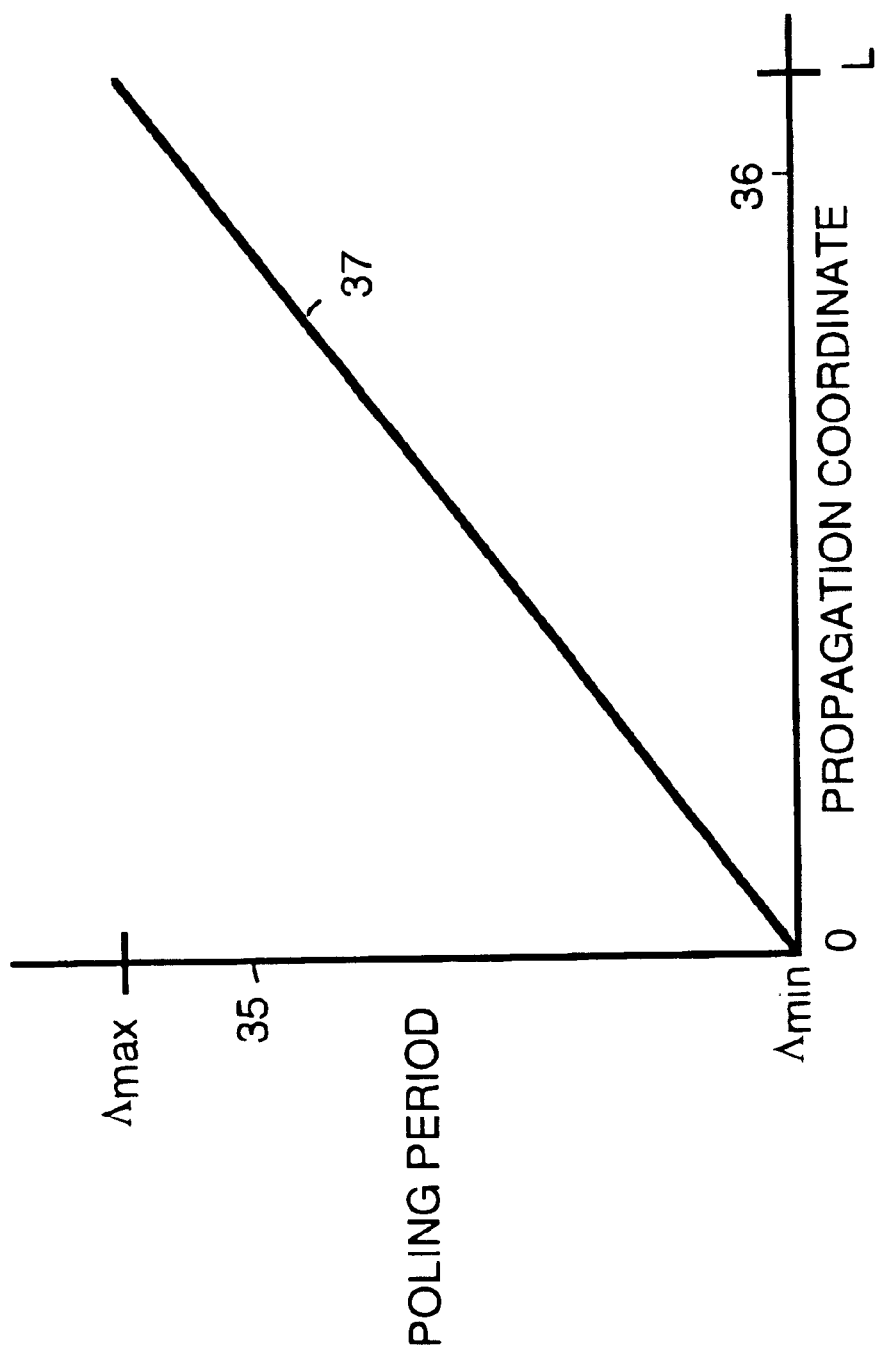
FIG. 3 shows a graph of pseudo-period to propagation coordinate for a linearly chirped crystal structure in accordance with a preferred embodiment of the present invention.

FIG. 3 is a graph showing a trace 37 that represents poling period (on a coordinate 35) versus propagation length (on a coordinate 36) of nonlinear crystal 13 for a linear chirp. A linear (i.e., uniform) chirp means that the rate of change in length of the poling period is constant throughout nonlinear crystal 13. In the case of a linear chirp, phase matching of focused optical signals propagated through the nonlinear crystal is chirped uniformly. Nonuniform chirping takes place when the rate of change in length of the poling period throughout a nonlinear crystal is not constant.

A linear chirp is optimal if and only if the wave profiles are independent of z, where z is the propagation coordinate and x and y are the transverse coordinates. This occurs if the waves are plane waves or if the waves are guided modes. Plane waves are theoretically the simplest to analyze in either linear or nonlinear optics; however, they are seldom used in practice in nonlinear optics (NLO) because of the sacrifice of intensity and hence interaction strength. Thus, linearly chirped QPM is best applied to waveguide NLO.

In contrast to waveguide NLO is bulk NLO. Bulk NLO generally uses Gaussian beams focused near the center of the crystal. As intensity is highest near the focus and falls off towards the end facets of the nonlinear crystal, linear chirping is no longer optimal. The central wavelength is already favored by tuning symmetry (or near symmetry) arguments. Increased intensity near the focal plane only enhances the response at the center-tuned wavelength even more at the expense of the detuned wavelengths.

A nonlinear (or nonuniform) chirp, in which the chirp slope is steeper near the center of the crystal and shallower towards the end facets, creates an effectively longer interaction length for wavelengths that become phase-matched near either crystal face (i.e., detuned wavelengths) and conversely a shorter interaction length for the center-tuned wavelength. Such a nonlinear chirp achieves a flatter response curve of efficiency versus wavelength.

Figure 4:
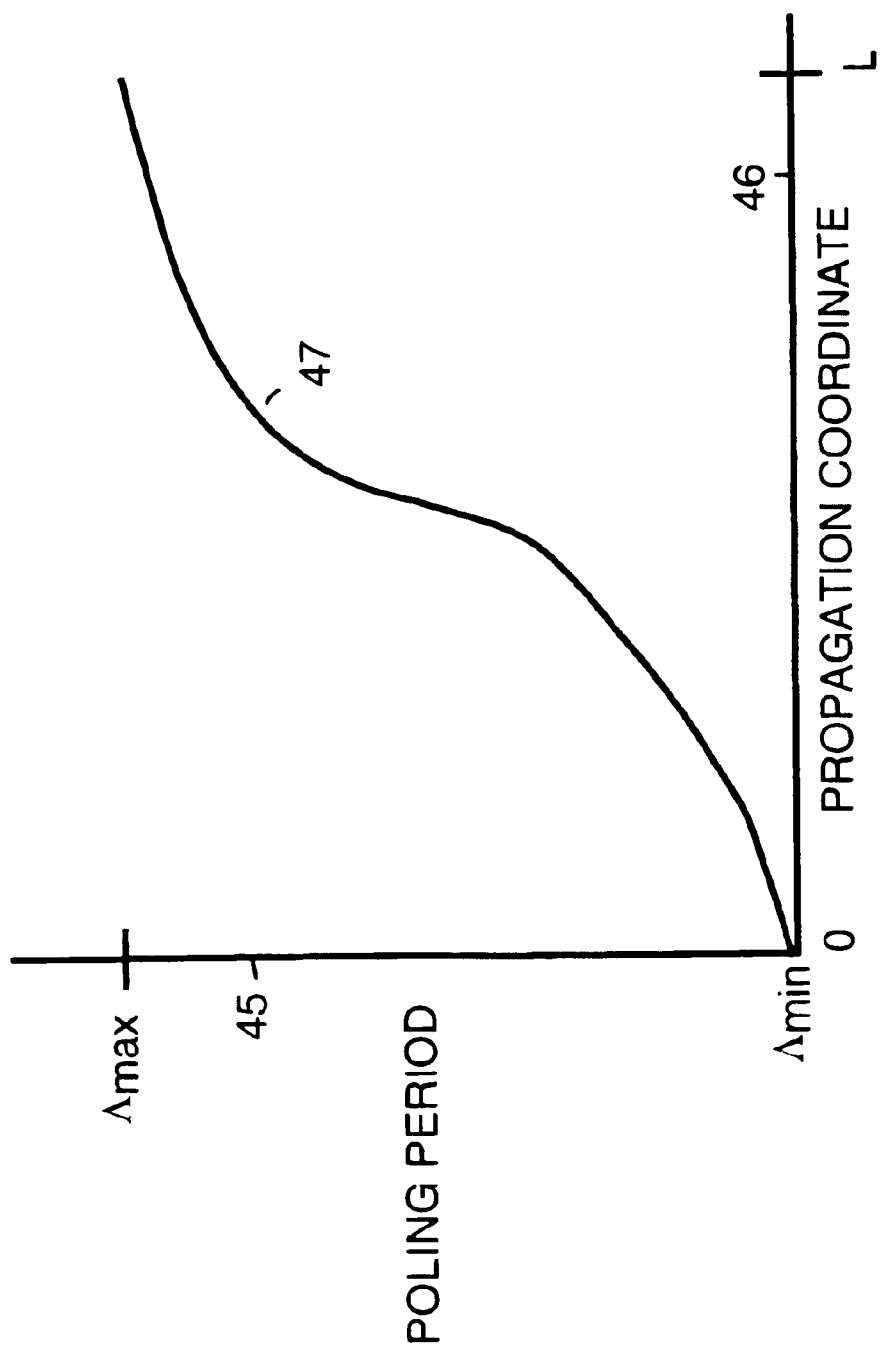
FIG. 4 shows an example graph of pseudo-period to propagation coordinate for a nonlinearly chirped crystal structure in accordance with a preferred embodiment of the present invention.

FIG. 4 is a graph showing a trace 47 that represents poling period (on a coordinate 45) versus propagation length (on a coordinate 46) of nonlinear crystal 13 for a nonlinear chirp as described above.

While FIG. 4 gives one example of nonuniform chirping, other nonuniform chirping of phase matching can also be advantageous. For example, a particularly easy implementation of a useful nonlinear chirp is a piecewise-linear (PWL) chirp, illustrated in FIG. 5.

Figure 5:
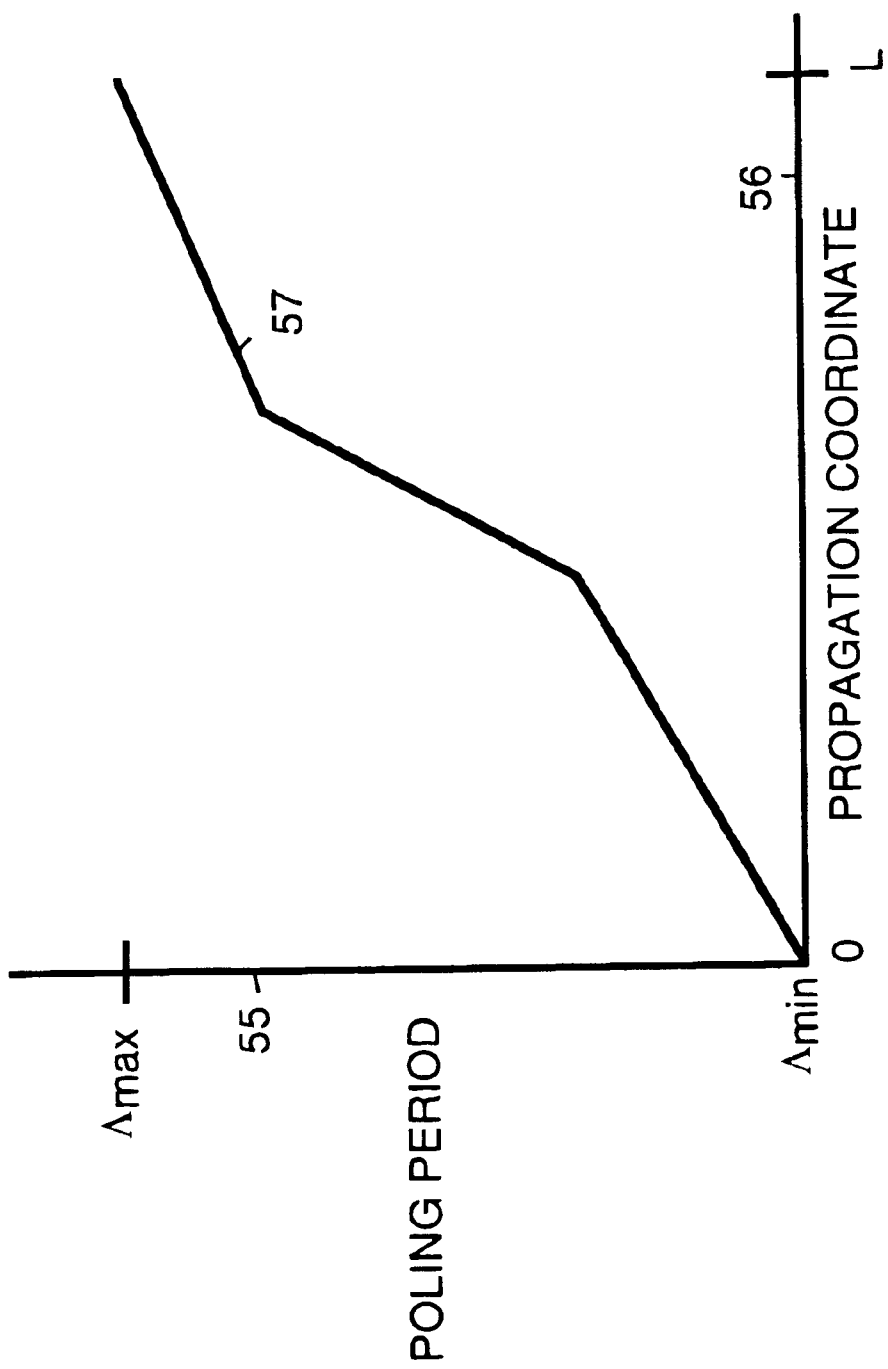
FIG. 5 shows an example graph of pseudo-period to propagation coordinate for a piecewise linearly chirped crystal structure in accordance with a preferred embodiment of the present invention.
Figure 6:
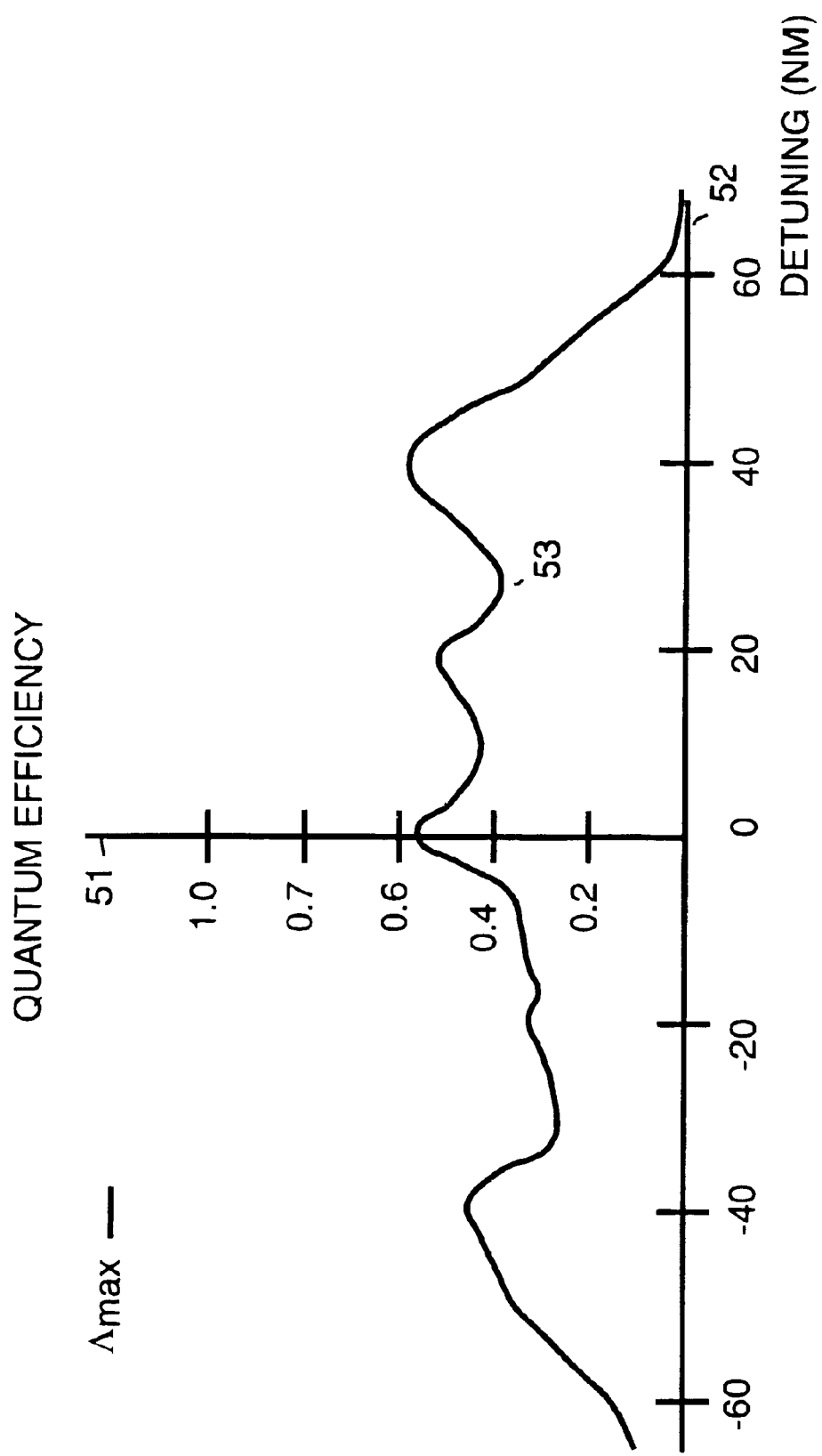
FIG. 6 is a graph that illustrates quantum efficiency for a piecewise linearly chirped crystal structure in accordance with a preferred embodiment of the present invention.

FIG. 5 is a graph showing a trace 57 that represents poling period (on a coordinate 55) versus propagation length (on a coordinate 56) of nonlinear crystal 13 for a piecewise-linear chirp.

Figure shows 6 shows an exemplary response curve calculation using periodically poled lithium niobate (PPLN). The x-axis represents detuning and the y-axis represents quantum efficiency. In this example, the signal wavelength is centered at 1.57 $\mu$m, the crossover between C-band (1.53–1.57 $\mu$m) and L-band (1.57–1.61 $\mu$m) of present-day optical communication. The pump (LO) wavelength is 0.78 $\mu$m. The 3-dB spectral acceptance is 104 nanometers (nm) (i.e., the wavelength coverage is 1.518–1.622 $\mu$m). For comparison, the 3-dB acceptance for the same length of linearly chirped PPLN (with the same total chirp from end to end) is approximately 78 nm and the 3-dB acceptance for the same length of unchirped PPLN is less than 8 nm.

One alternative is to use side-by-side fixed-period tracks, each track with a slightly different period. Essentially each track represents a different wavelength channel. The drawback of this scheme is that one must reposition the crystal every time the user changes wavelength.

Wavelength-division multiplexing (WDM) could substitute for mechanical translation. However, existing WDM technology is not applicable in the case of optical signal sampling because, although the signal wavelength can be appropriately channel-selected by the WDM network, the pump wavelength is fixed and hence not correctly channelized. A widely tunable "tracking" pump might appear to be the solution at first, however, signal and pump should be nondegenerate, making the network design much more difficult than ordinary WDM. For frequency doubling or second harmonic generation (SHG) WDM technology can be applied. However, from an instrumentation point of view, SHG only provides autocorrelation information about relatively strong signals whereas in the study of optical communication signals, cross-correlation information about very weak signals is desired.

As there are mechanical hysteresis issues and time constants involved in position control, unavoidable downtime associated with channel changing is experienced. The preferred embodiment of the present invention saves cost and avoids any downtime by dispensing with mechanical stepper motors. Furthermore, future optical systems might employ less channelization and more bandwidth per channel, a situation less suited toward multiple tracks but better handled by chirped QPM.

The use of nonuniformly chirped poling in a nonlinear crystal is an improvement over linear chirping where chirping is done uniformly (See Martin M. Fejer, et al., "Quasi-Phase-Matched Second Harmonic Generation: Tuning and Tolerances", IEEE Journal of Quantum Electronics, Vol. 28, No. 11, November 1992). Widening of the spectral acceptance using nonuniform chirping as described herein takes into account focused optical beams, which is a significant improvement over the prior art.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A nonlinear crystal used for mixing of optical signals, the nonlinear crystal comprising:
   a plurality of domains, the domains being arranged serially across the nonlinear crystal, the domains having alternating polarity; and,
   wherein the poling periods of the domains are varied across the nonlinear crystal so as to provide a nonuniform chirping of phase matching of focused optical signals propagated through the nonlinear crystal.

2. A nonlinear crystal as in claim 1 wherein the nonlinear crystal is composed of periodically poled lithium niobate (PPLN).

3. A nonlinear crystal as in claim 1 wherein a chirp slope is steeper near a center of the non-linear crystal and shallower towards end facets of the non-linear crystal.

4. A nonlinear crystal as in claim 1, wherein the poling periods of the domains are varied across the nonlinear crystal so as to provide nonlinear chirping of phase matching of the focused optical signals propagated through the nonlinear crystal.

5. A nonlinear crystal as in claim 1, wherein the poling periods of the domains are varied across the nonlinear crystal so as to provide piecewise linear chirping of phase matching of the focused optical signals propagated through the nonlinear crystal.

6. A nonlinear crystal as in claim 1 wherein the focused optical signals comprise:
   a first focused optical signal; and,
   a second focused optical signal, the second focused optical signal being an optical strobe signal.

7. A nonlinear crystal as in claim 1 wherein nonlinear crystal is within an optical sampling digital oscilloscope.

8. A method for increasing spectral acceptance within a nonlinear crystal, the method comprising the following steps:
   (a) arranging the nonlinear crystal as a plurality of domains, the plurality of domains having alternating polarity as the domains are traversed serially across the nonlinear crystal; and,
   (b) varying the poling periods of the domains across the nonlinear crystal so as to provide a nonuniform chirping of phase matching of focused optical signals propagated through the nonlinear crystal.

9. A method as in claim 8 wherein in step (a) the nonlinear crystal is composed of periodically poled lithium niobate (PPLN).

10. A method as in claim 8 wherein in step (b) a chirp slope is steeper near a center of the non-linear crystal and shallower towards end facets of the non-linear crystal.

11. A method as in claim 8, wherein in step (b) the poling periods of the domains are varied across the nonlinear crystal so as to provide nonlinear chirping of phase matching of the focused optical signals propagated through the nonlinear crystal.

12. A method as in claim 8, wherein in step (b) the poling periods of the domains are varied across the nonlinear crystal so as to provide piecewise linear chirping of phase matching of the focused optical signals propagated through the nonlinear crystal.

13. A nonlinear crystal with increased spectral acceptance, the nonlinear crystal comprising:
   a plurality of domains, the domains being arranged serially across the nonlinear crystal, the domains having alternating polarity; and,
   wherein the poling periods of the domains are varied across the nonlinear crystal so as to provide a nonuniform chirping of phase matching of focused optical signals propagated through the nonlinear crystal.

14. A nonlinear crystal as in claim 13, wherein the nonlinear crystal is composed of periodically poled lithium niobate (PPLN).

15. A nonlinear crystal as in claim 13 wherein a chirp slope is steeper near a center of the non-linear crystal and shallower towards end facets of the non-linear crystal.

16. A nonlinear crystal as in claim 13, wherein the poling periods of the domains are varied across the nonlinear crystal so as to provide nonlinear chirping of phase matching of the focused optical signals propagated through the nonlinear crystal.

17. A nonlinear crystal as in claim 13, wherein the poling periods of the domains are varied across the nonlinear crystal so as to provide piecewise linear chirping of phase matching of the focused optical signals propagated through the nonlinear crystal.

18. A nonlinear crystal as in claim 13, wherein nonlinear crystal is within an optical sampling digital oscilloscope.

* * * * *